United States Patent
Esman

(10) Patent No.: US 10,698,097 B1
(45) Date of Patent: Jun. 30, 2020

(54) MULTI-BEAM PHOTONIC MONOPULSE COMPARATOR

(71) Applicant: Rockwell Collins, Inc., Cedar Rapids, IA (US)

(72) Inventor: Ronald D. Esman, McLean, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/512,658

(22) Filed: Jul. 16, 2019

Related U.S. Application Data

(63) Continuation-in-part of application No. 16/265,659, filed on Feb. 1, 2019.

(51) Int. Cl.
*G01S 13/44* (2006.01)
*G02F 1/21* (2006.01)

(52) U.S. Cl.
CPC ............ *G01S 13/4409* (2013.01); *G02F 1/21* (2013.01); *G02F 2001/212* (2013.01)

(58) Field of Classification Search
None
See application file for complete search history.

(56) References Cited

U.S. PATENT DOCUMENTS 5,977,911 A * 11/1999 Green .................. H01Q 3/22
342/157

OTHER PUBLICATIONS

Anwar, N. et al., "Design Considerations for an Electrooptic Directional Coupler Modulator", Journal of Lightwave Technology, vol. 17, No. 4, Apr. 1999, 8 pages.
IEEE Photonics Society News, "A Tutorial on Microwave Photonics Including: True-time Delay Beamforming", Jun. 2012, vol. 26, No. 3, www.photonicsSociety.org, 40 pages.
Sherman, Samuel M. et al., Monopulse Principles and Techniques, Second Edition, Published: Jul. 1, 2010, 1 page.
Yaron, Lior et al., "Photonic Beamformer Receiver With Multiple Beam Capabilities", IEEE Photonics Technology Letters, vol. 22, No. 23, Dec. 1, 2010, 3 pages.

(Continued)

*Primary Examiner* — David W Lambert
(74) *Attorney, Agent, or Firm* — Suiter Swantz pc llo

(57) ABSTRACT

A multi-beam photonic monopulse comparator is disclosed. Photonic inputs incorporating M component wavelengths are split into equivalent inputs for each quadrant subarray and array element (e.g., N array elements in each quadrant subarray). Within each array element, the component wavelengths are apodized by attenuators and the apodized input signal modulated by a received inbound RF signal (via broadband Mach-Zehnder electro-optical modulators). The resulting positive-polarity and negative-polarity modulated photonic signals are demultiplexed and each component wavelength time-delayed. Time-delayed wavelength-selective optical delay channels are copied and combined by single mode/multi-mode (SM/MM) couplers into photonic antenna beams and simultaneously generated photonic comparator outputs (elevational difference, sum, azimuthal difference) for each component wavelength. High-speed photodiodes convert the photonic beams and corresponding comparator outputs into RF output signals, from which angle of arrival information for the received inbound RF signals may be calculated.

15 Claims, 7 Drawing Sheets

(56) References Cited

OTHER PUBLICATIONS

Zhang, Fangzheng et al., "Photonics-based real-time ultra-high-range-resolution radar with broadband signal generation and processing", Scientific Reports, 7:13848, DOI:10.1038/s41598-017-14306-y, www.nature.com/scientificreports, Oct. 23, 2017, 8 pages.

* cited by examiner

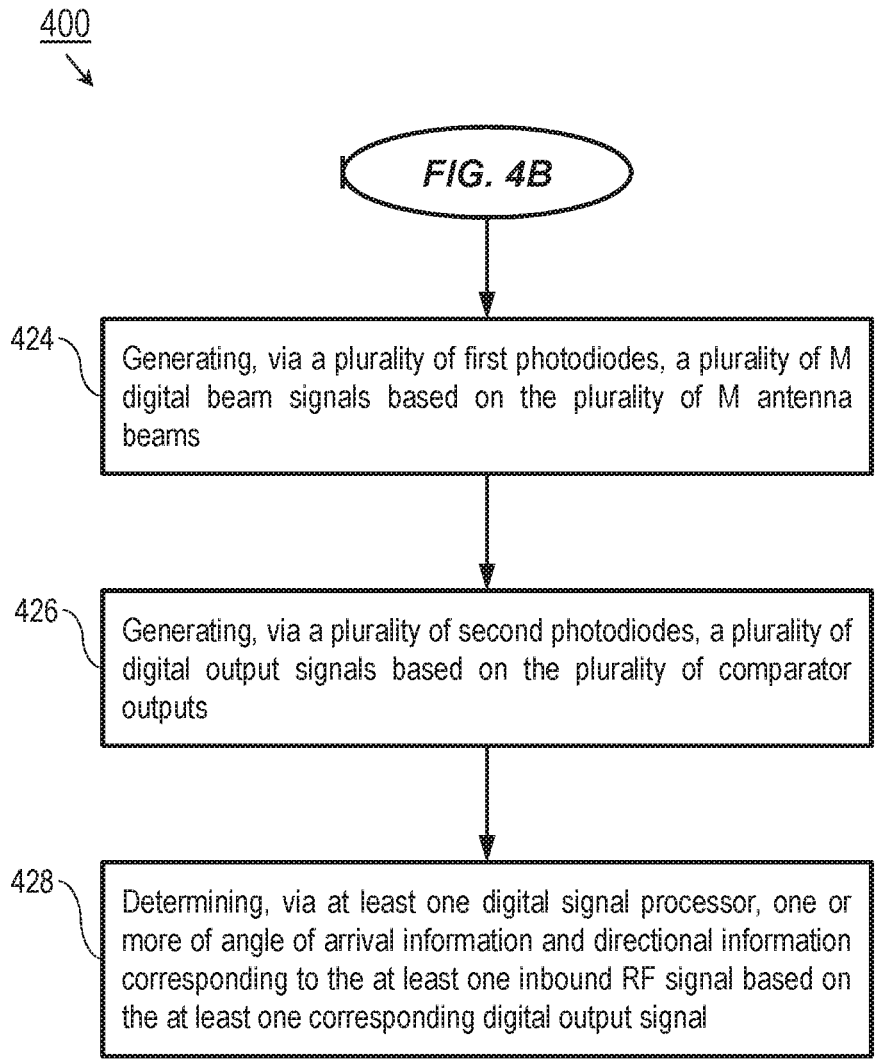

MULTI-BEAM PHOTONIC MONOPULSE COMPARATOR

CROSS-REFERENCE TO RELATED APPLICATIONS

The present application claims priority under 35 U.S.C. § 120 as a continuation-in-part of co-pending U.S. patent application Ser. No. 16/265,659 filed Feb. 1, 2019. Said U.S. patent application Ser. No. 16/265,659 is herein incorporated by reference in its entirety.

BACKGROUND

Monopulse radar, also known as simultaneous lobe comparison, provides the direction of arriving radiation (e.g., radio frequency (RF) or other electromagnetic signals) by comparing the signals produced by monopulse elements steered in slightly different directions ("squinted" subarrays or signals). Monopulse radar may be useful for determining angle of arrival in one or more dimensions, but electronic components may provide challenges with respect to their performance, loss, or relative size. Further, it may not be possible via conventional RF electronics to achieve multiple simultaneous beams (e.g., simultaneous beamforming and generation of comparator output) over wide bandwidths.

SUMMARY

A multi-beam photonic monopulse comparator is disclosed. In embodiments, the multi-beam photonic monopulse comparator includes laser emitters or other photonic input sources for generating a set of M photonic inputs, each input corresponding to one of M component wavelengths. The M photonic inputs are multiplexed into a combined photonic input and then split into equivalent photonic inputs (e.g., into 4 quadrant inputs and again into 4N elemental inputs, where each of four quadrant subarrays incorporates N array elements). Within each of the N array elements of the four quadrant subarrays, each elemental input is demultiplexed into a set of M elemental channels (again corresponding to the M component wavelengths). An array of M optical attenuators then apodize each elemental channel before re-multiplexing into a combined photonic elemental input. Antenna elements within each array element receive an inbound radio frequency (RF) signal which feeds a dual-output (DO) electro-optical modulator (EOM) which modulates the combined photonic elemental input into two modulated photonic signals having a relative phase of 180 degrees (e.g., one positive polarity, one negative polarity). Positive-polarity and negative-polarity demultiplexers separate the modulated photonic signals into arrays of wavelength-specific M optical delay channels. Each array of optical delay channels is time-delayed by an array of optical time delay units, each component wavelength associated with a distinct time delay. Each array of time-delayed optical delay channels (positive and negative) is then split, copying each time-delayed optical delay channel. The multi-beam photonic monopulse comparator includes single mode/multimode (SM/MM) couplers for receiving the time-delayed optical delay channels (e.g., photonic channels) and simultaneously generating 1) an antenna beam corresponding to each component wavelength (and to a beam direction) and 2) photonic comparator outputs, or photonic equivalents of two-dimensional monopulse comparator outputs (e.g., sum, elevational difference, azimuthal difference). An array of high-speed photodiodes coupled to the SM/MM couplers convert the antenna beam and photonic comparator outputs to RF beam and comparator output signals, which may then be digitized and processed to determine directional information of the inbound RF signal.

A method for simultaneous multi-beam photonic comparator operations is also disclosed. In embodiments, the method includes generating M photonic inputs, each photonic input corresponding to one of M component wavelengths. The method includes multiplexing the M component photonic inputs into a combined input. The method includes splitting the combined input into a set of equivalent photonic inputs, e.g., one equivalent photonic input per N array elements of four quadrant subarrays. The method includes, within each of the four quadrant subarrays and N array elements, apodizing the demultiplexed component wavelengths of each combined photonic input via optical attenuators. The method includes receiving, within each array element, an inbound RF signal via an antenna element. The method includes modulating the apodized combined photonic inputs according to the inbound RF signal via dual-output electro-optical modulators (DO-EOM), generating positive-polarity and negative-polarity photonic signals having a relative phase of 180 degrees. The method includes demultiplexing each modulated photonic signal into an array of M wavelength-specific optical delay channels. The method includes time-delaying each optical delay channel according to its associated component wavelengths. The method includes copying each time-delayed optical delay channel via optical splitters. The method includes simultaneously combining, via single mode/multimode (SM/MM) couplers, the time-delayed optical delay channels into M antenna beams (each antenna beam corresponding to a component wavelength) and M corresponding sets of three photonic comparator outputs (elevational difference, sum, azimuthal difference). The method includes simultaneously generating, via high-speed photodiodes, M RF beam signals based on the antenna beams and M sets of 3 RF output signals, each output signal based on a photonic comparator output.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

and FIGS. 4A through 4C are flow diagrams illustrating a method for multi-beam photonic beamforming with simultaneous comparator output in accordance with example embodiments of this disclosure.

DETAILED DESCRIPTION

Figure 1:
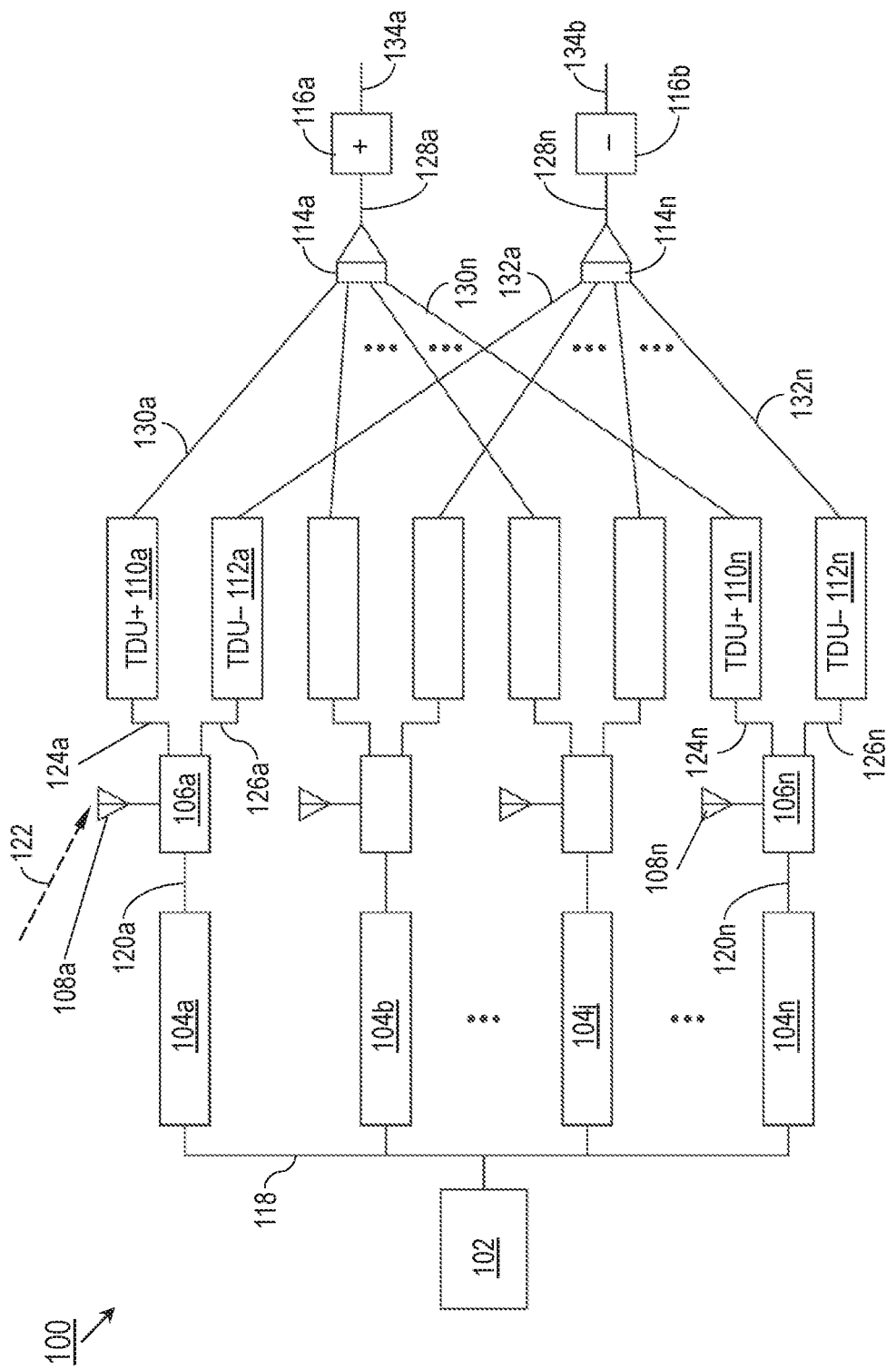
FIG. 1 is a diagrammatic illustration of an architecture for a noncoherent photonic beamformer in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, an N-element noncoherent true time delay (TTD) photonic beamformer 100 is disclosed. The noncoherent photonic beamformer 100 may include a photonic source 102 (PS), optical attenuators 104a-n, electro-optical modulators 106a-n (EOM), radio frequency (RF) antenna elements 108a-n, optical time delay units 110a-n, 112a-n (TDU), single-mode/multimode (SM/MM) couplers 114a-b, and high-speed photodiodes 116a-b (e.g., photodetectors). One or more components of the photonic beamformer 100 may be interconnected or linked, e.g., via optical fiber, optical waveguide, or any other appropriate optical transmission medium associated with an optical path. Further, the noncoherent photonic beamformer 100 or its components may include additional amplifiers or filters positioned in the optical path (e.g., or proximate to the antenna elements 108a-n) to prevent or alleviate signal loss. In embodiments, the SM/MM couplers 114a-b (e.g., some embodiments may be referred to as a "photonic lantern") serve to combine signals of possibly equal wavelength onto a single photodiode 116a-b without suffering from coherent interference effects. Throughout the various embodiments disclosed, the terms "photonic" and "optical" are interchangeable.

In embodiments, the photonic beamformer 100 may be embodied in a two-dimensional array covering two angular dimensions via four quadrant subarrays A, B, C, D, as substantially disclosed by pending U.S. patent application Ser. No. 16/265,659, which is herein incorporated by reference in its entirety. Each quadrant subarray A, B, C, D may incorporate N array elements (e.g., RF antenna elements 108a-n), each array element having a particular orientation or direction. The PS 102 may be a continuous-wave or pulsed laser configured for emission of a photonic input 118 (e.g., optical input). The photonic input 118 may be split into N equivalent inputs, each input apodized (i.e., weighting to accomplish beamshaping, focusing, or removal of Airy disks) by an optical attenuator 104a-n. The EOM 106a-n may be broadband dual-output (DO) electro-optical modulators (EOM) (e.g., directional coupler modulator (DCM), dual-output Mach-Zehnder modulator (DO-MZM), or any other appropriate DO modulator having dual outputs of opposing polarity) configured for intensity modulation of the N apodized photonic inputs (120a-n) according to the inbound RF signal 122 received at each antenna element 108a-n, possibly filtered or amplified (not shown), resulting in 2N RF-modulated photonic signals 124a-n (e.g., positive-polarity modulated photonic signals), 126a-n (e.g., negative-polarity modulated photonic signals). The relative phase between the RF modulation on the photonic signals (124a-n vs. 126a-n) is nominally 180 degrees. The RF-modulated photonic signals 124a-n, 126a-n may each be optically delayed by 2N optical TDUs (e.g., N positive TDUs 110a-n (TDU+) time delay the positive-polarity modulated photonic signals 124a-n and N negative TDUs 112a-n (TDU−) time delay the negative-polarity modulated photonic signals 126a-n) by a particular time delay in order to provide wideband time-delayed beamforming. The SM/MM couplers 114a-b may achieve beamforming by selective signal combination in the optical domain; for example, the SM/MM coupler 114a may generate a positive-polarity antenna beam 128a via combination of the N time-delayed positive-polarity modulated photonic signals 130a-n from each of the N array elements, while the SM/MM coupler 114b may generate a negative-polarity antenna beam 128b via combination of the N time-delayed negative-polarity modulated photonic signals 132a-n from each of the N array elements. The photodiodes 116a-b may in turn generate RF beam signals 134a-b by respectively converting the positive-polarity and negative-polarity photonic signals into RF signals 128a-b. An advantage of the photonic beamformer 100 is that, instead of digitizing RF signals from all N antenna elements 108a-n, only two RF beam signals 134a-b need to be digitized for further processing and storage.

Figure 2:
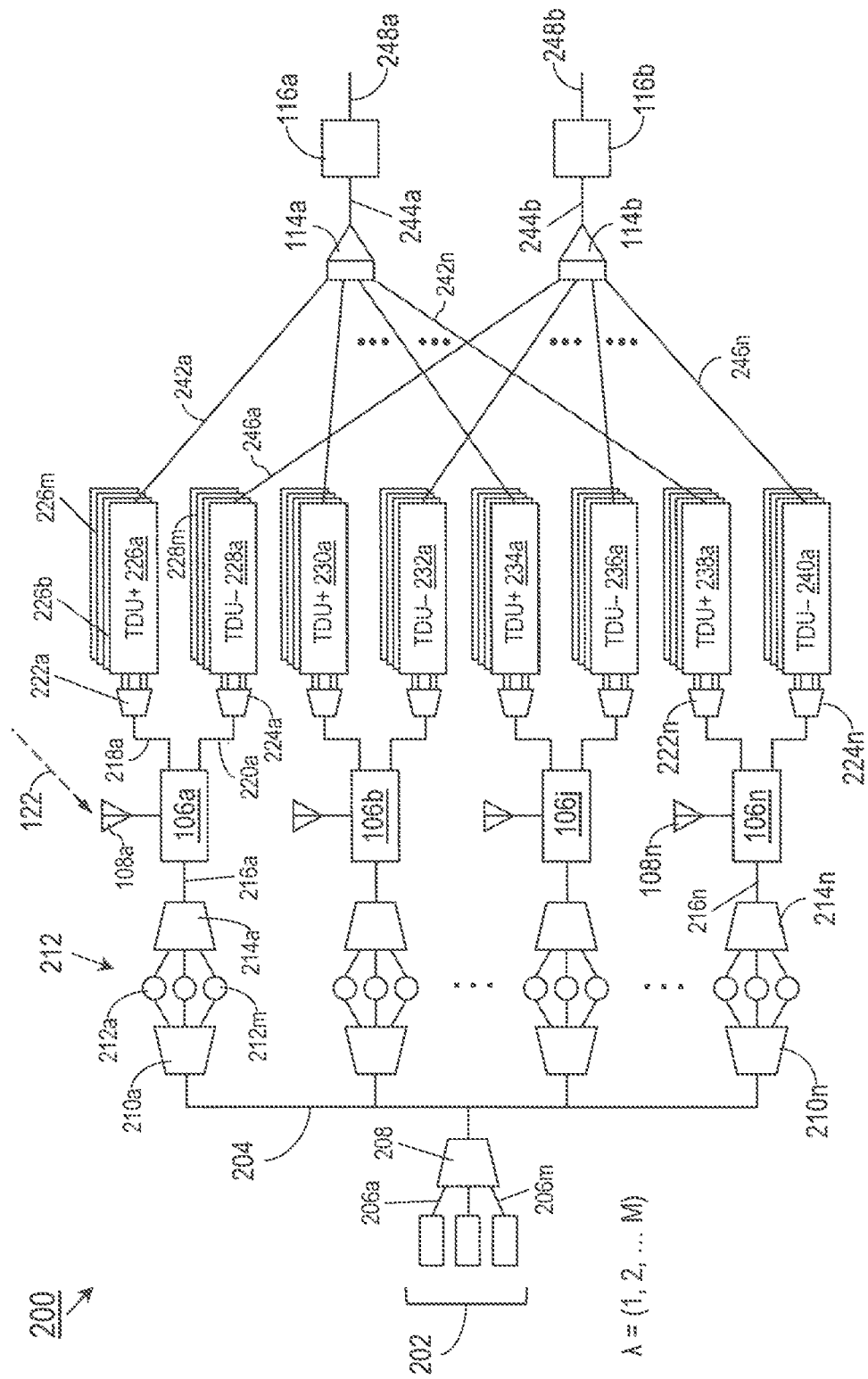
FIG. 2 is a diagrammatic illustration of a multiple-beam architecture of the noncoherent photonic beamformer of FIG. 1.

Referring to FIG. 2, a multiple-beam photonic beamformer 200 is disclosed. The photonic beamformer 200 may be implemented and may operate similarly to the N-element noncoherent true time delay (TTD) photonic beamformer 100 of FIG. 1, except that the photonic beamformer 200 may incorporate a multiple-wavelength PS 202, e.g., an array of M distributed feedback lasers (DFL) configured for generating a photonic input 204 comprising M multiple discrete wavelengths 206a-m ($\lambda_1, \lambda_2, \ldots \lambda_M$) multiplexed (muxed) by an arrayed waveguide grating 208 (AWG) or any appropriate similar wavelength-selective multiplexer (mux) and split into N equivalent feeds, e.g., using a wavelength-independent splitter.

In embodiments, the photonic beamformer 200 may replace the optical attenuators 104a-n (FIG. 1) with, for each array element 1 . . . N, an AWG wavelength selective demultiplexer 210a-n (demux), wavelength-selective optical attenuator bank 212, and AWG wavelength-selective mux 214a-n. For example, the demux 210a-n may demultiplex the photonic input 204 into its M component wavelengths, each individual component wavelength apodized by a wavelength-selective optical attenuator 212a-m and recombined into an apodized photonic input 216a-n by the mux 214a-n. The apodized photonic inputs 216a-n may be modulated (via the EOM 106a-n) according to the inbound RF signal 122 received by the antenna elements 108a-n (e.g., and possibly pre-processed by filters, amplifiers, etc. (not shown)). The positive-polarity modulated photonic signals 218a-n and negative-polarity modulated photonic signals 220a-n output by the EOM 106a-n may each be demuxed (via positive and negative demuxes 222a-n, 224a-n) into M component wavelength channels, each wavelength channel sent through an optical TDU (e.g., TDU+ 226a-m corresponding to array element 1, 230a-m corresponding to array element 2, 234a-m corresponding to array element j, and 238a-m corresponding to array element N; similarly TDU− 228a-m (1), 232a-m (2), 236a-m (j), 240a-m (N)) to time-delay the wavelength channel according to a time delay for each component wavelength (206a-m), e.g., the time delay set to steer the received beam direction).

In embodiments, the photonic beamformer 200 may incorporate a pair of SM/MM couplers 114a-b and photodiodes 116a-b for each of the M component wavelengths 206a-m. For example, the SM/MM coupler 114a may collect the N time-delayed positive-polarity modulated photonic signals 242a-n of a given wavelength (206a-m) output by the TDU+ 226a, 230a . . . 234a . . . 238a (e.g., for each array element 1 through N), forming a wavelength-selective positive-polarity optical antenna beam 244a therefrom. Similarly, and simultaneously, the SM/MM coupler 114b may collect the N time-delayed negative-polarity modulated photonic signals 246a-n of a given wavelength (206a-m) output by the TDU− 228a, 232a . . . 236a . . . 240a, forming a wavelength-selective negative-polarity optical antenna beam 244b therefrom. The wavelength-selective positive-polarity and negative polarity optical antenna beams 244a-b may be respectively converted into wavelength-selective positive-polarity and negative-polarity RF beam signals 248a-b by the photodiodes 116a-b. In this way, the photonic beamformer 200 may generate M beams, one for each of the M component wavelengths 206a-m.

Figure 3A:
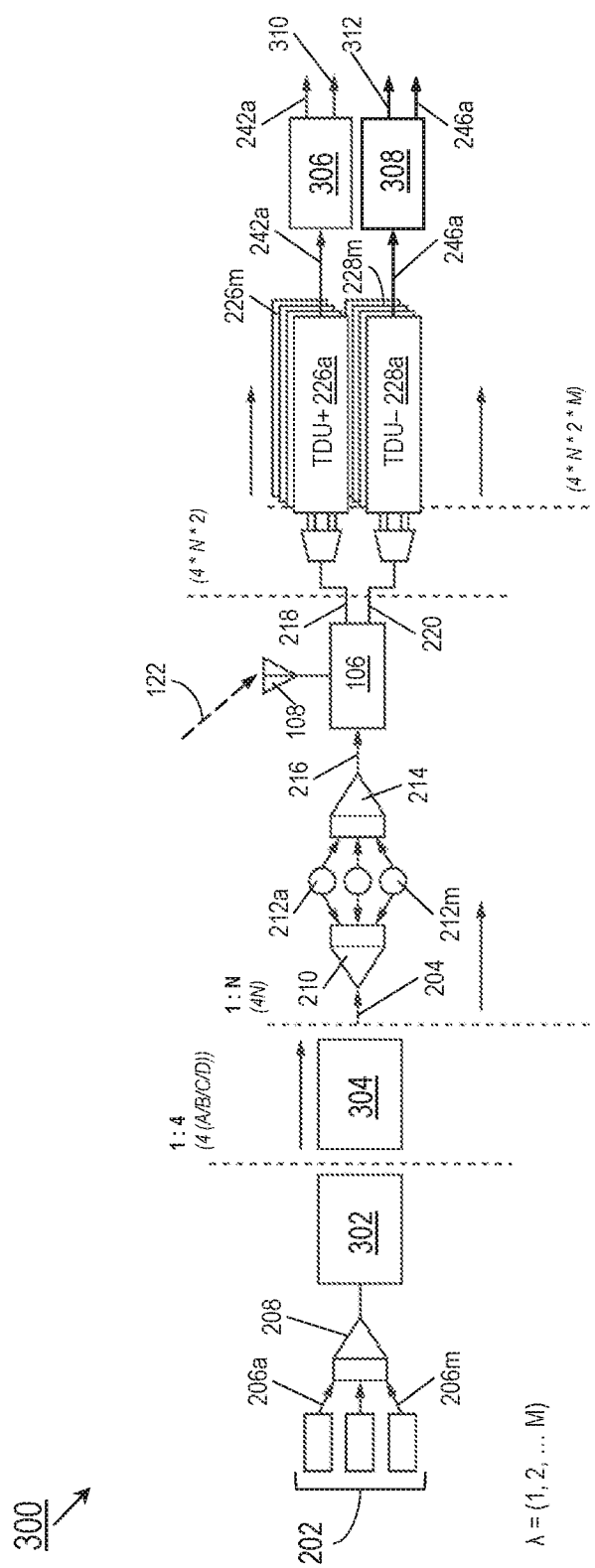
FIGS. 3A and 3B are diagrammatic illustrations of a simultaneous photonic monopulse comparator in accordance with example embodiments of this disclosure.
Figure 3B:
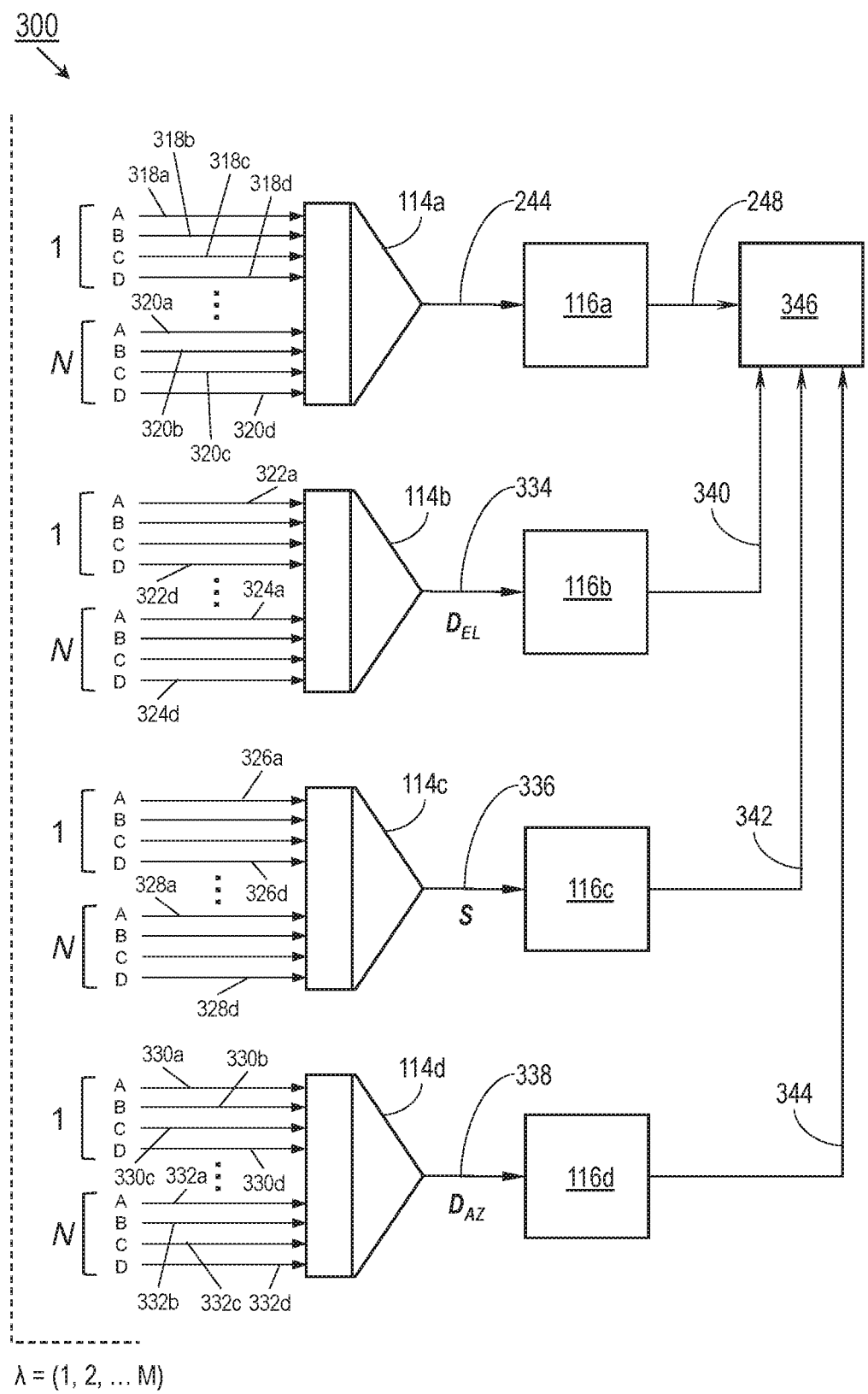

Referring to FIGS. 3A and 3B, a multi-beam photonic monopulse comparator 300 is disclosed. The photonic monopulse comparator 300 may be implemented and may function similarly to the multiple-beam photonic beamformer 200 of FIG. 2, except that the photonic monopulse comparator 300 may route the M component wavelengths through 4 quadrant subarrays and provide for simultaneous generation of wavelength-selective antenna beams and their corresponding monopulse comparator outputs. For example, as substantially disclosed by U.S. patent application Ser. No. 16/265,659, which is herein incorporated by reference in its entirety, given a monopulse array incorporating four subarrays in two angular dimensions receiving inbound RF signals 122 from squinted directions and producing signals A, B, C, D (e.g., voltage outputs), it is possible to convert the antenna signals A, B, C, D into a sum S, an azimuthal difference $D_{AZ}$, and an elevational difference $D_{EL}$, with the azimuthal angle and elevational angle of the inbound RF signal 122 relative to the monopulse array derivable therefrom (a diagonal difference may additionally be generated and remain unused).

Referring in particular to FIG. 3A, in embodiments, the photonic input 204 (e.g., comprising M component wavelengths 206a-m, FIG. 2) may be passed through a 1:4 optical splitter 302, and from each 1:4 optical splitter 302 to a 1:N optical splitter 304, to generate 4N equivalent photonic inputs (e.g., or an equivalent photonic input 204 for each of N array elements of each of 4 quadrant subarrays A/B/C/D). Each of the 4N photonic inputs 204 may then be demuxed (210) into its M component wavelengths (206a-m), the component wavelengths each apodized by an optical attenuator (212a-m) and muxed (214) into a single apodized photonic input 216. Each apodized photonic input 216 may be modulated (via the broadband DO-EOM 106) according to the inbound RF signal 122 received by the antenna element 108 (of each array element 1-N of each quadrant subarray A-D). Similarly, the output of each DO-EOM 106, e.g., the positive-polarity modulated photonic signal 218 and negative-polarity modulated photonic signal 220, may be demuxed (via positive demux 222 and negative demux 224) into their M component wavelength channels and respectively time-delayed by TDU+ 226a-m and TDU− 228a-m (e.g., 4N blocks of 2M TDU each (M TDU+/M TDU−)). The resulting 4×N×M time-delayed positive-polarity modulated photonic signals 242 (and the 4×N×M time-delayed negative-polarity modulated photonic signals 246) may each be copied by an optical splitter 306, 308, such that each time-delayed positive-polarity modulated photonic signal 242 and each time-delayed negative-polarity modulated photonic signal 246 has at least one copy 310, 312 (similarly for, resulting in a 4×N×2×M×2 total time delayed modulated photonic output signals).

Referring in particular to FIG. 3B, the photonic monopulse comparator 300 may incorporate, for each component wavelength (206a-m), a block of four SM/MM couplers 114a-d and four photodiodes 116a-d. Each SM/MM coupler 114a-d may receive a total of 4N inputs, or one input corresponding to each array element (1 . . . N) of each quadrant subarray (1-4). For example, the SM/MM coupler 114a-d may receive time-delayed modulated photonic inputs 318a-d . . . 320a-d, each time-delayed modulated photonic input 318a corresponding to a time-delayed positive-polarity or negative-polarity modulated photonic signal (e.g., 242a or 246a (FIG. 3A)) and to a quadrant subarray (A-D), and each set of time-delayed modulated photonic inputs 318a-d corresponding to an array element (1 . . . N). The inputs 318a-d . . . 320a-d to each SM/MM coupler 114a-d may each combine, or simultaneously incorporate, the corresponding time-delayed positive-polarity or negative-polarity modulated photonic inputs. Similarly and simultaneously, the SM/MM couplers 114b-d may respectively receive 4N time-delayed simultaneous positive/negative modulated photonic inputs 322a-d . . . 324a-d; 326a-d . . . 328a-d; and 330a-d . . . 332a-d, each set of inputs based on copies (310/312) of the original time-delayed positive-polarity and negative-polarity modulated photonic inputs 242a, 246a. Typically, only positive or only negative polarity signals may be combined from a given quadrant A, B, C, or D, depending on the corresponding output of the SM/MM couplers 114b-d, which are photonic versions of monopulse comparator outputs. For example, the SM/MM coupler 114b may generate a photonic comparator output 334 corresponding to a two-dimensional elevation difference ($D_{EL}=[(A+C)-(B+D)]/2$), and thus its A-quadrant and C-quadrant inputs (322a, 322c . . . 324a, 324c) may be positive-polarity while its B-quadrant and D-quadrant inputs (322b, 322d . . . 324b, 324d) may be negative-polarity. Similarly, the SM/MM coupler 114c may generate a photonic comparator output 336 corresponding to a two-dimensional sum ($S=(A+B+C+D)/2$) and based solely on positive-polarity inputs. Finally, the SM/MM coupler 114d may generate a photonic comparator output 338 corresponding to a two-dimensional azimuthal difference ($D_{AZ}=[(C+D)-(A+B)]/2$), based on positive-polarity C-quadrant and D-quadrant inputs (330b, 330d . . . 332b, 332d) and negative-polarity A-quadrant and B-quadrant inputs (330a, 330c . . . 332a, 332c).

In embodiments, the SM/MM coupler 114a may combine its 4N time-delayed modulated photonic inputs 318a-d . . . 320a-d to form an optical antenna beam 244 corresponding to the component wavelength (206a-m, FIG. 2) and to the corresponding beam direction. The SM/MM couplers 114b-d may simultaneously combine their respective 4N time-delayed modulated photonic inputs (322a-d . . . 324a-d; 326a-d . . . 328a-d; and 330a-d . . . 332a-d) in the optical domain to generate photonic comparator outputs 334, 336, 338 equivalent to monopulse comparator outputs corresponding to the beam direction of the optical antenna beam 244. The photodiodes 116a-d may respectively, and simultaneously, convert the optical antenna beam 244 and the photonic comparator outputs 334, 336, 338, generating an RF beam signal 248 and RF output signals 340, 342, 344 (again corresponding to $D_{EL}$, S, and $D_{AZ}$ respectively). As noted above, the RF beam signal and RF output signals (248, 340, 342, and 344) are comparable to conventional RF outputs from conventional monopulse comparators; however, the photonic approach provides the added benefit of multiple simultaneous beams over wide bandwidths.

In embodiments, the photonic monopulse comparator 300 may further incorporate digital signal processors 346 (DSP) for digitizing the RF beams and calculating, in the digital domain, angle of arrival information (e.g., azimuthal angle, elevational angle) of the inbound RF signal 122 based on the RF beam signal 248 and the RF output signals 340, 342, 344.

Figure 4A:
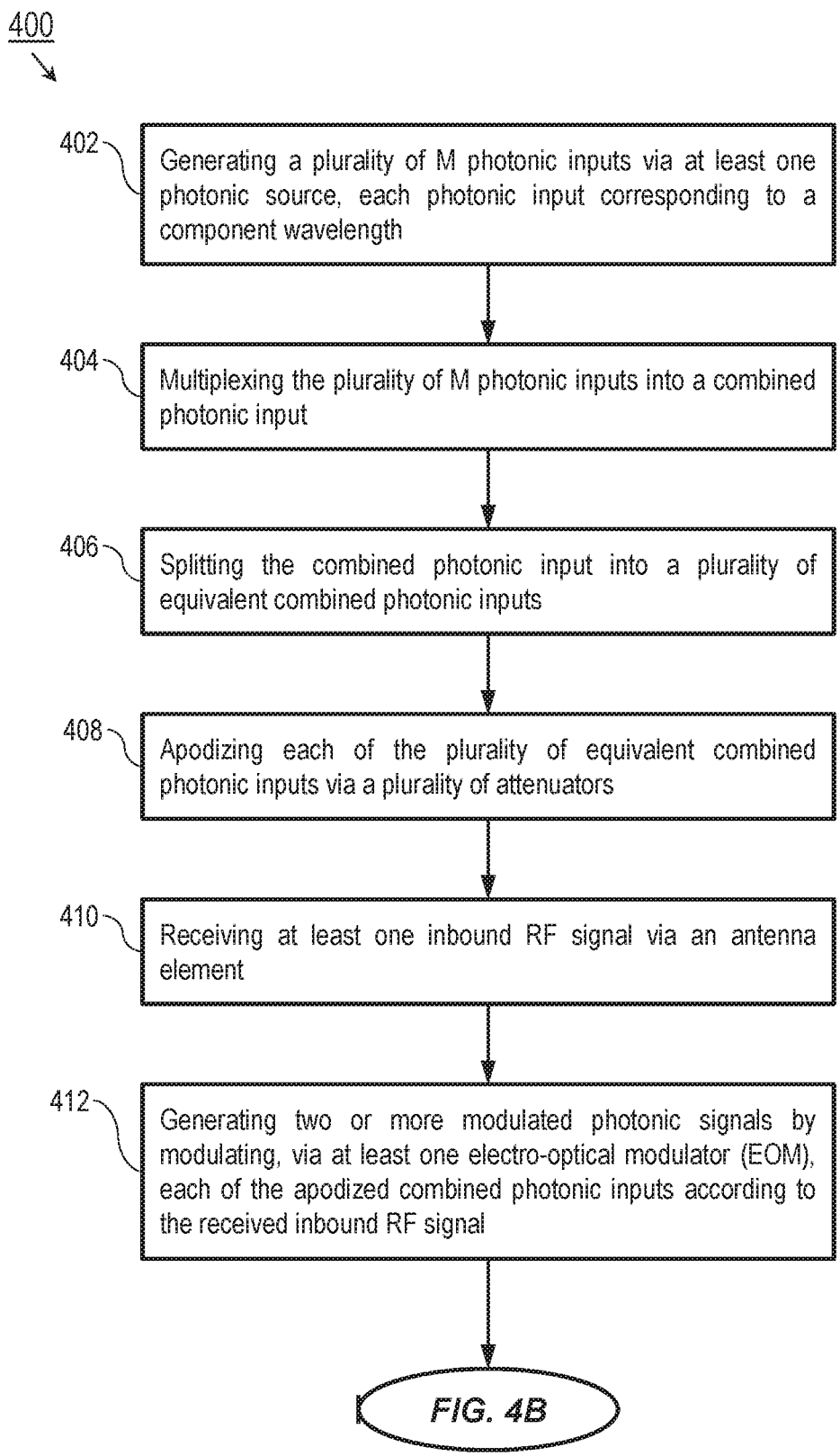
Figure 4B:
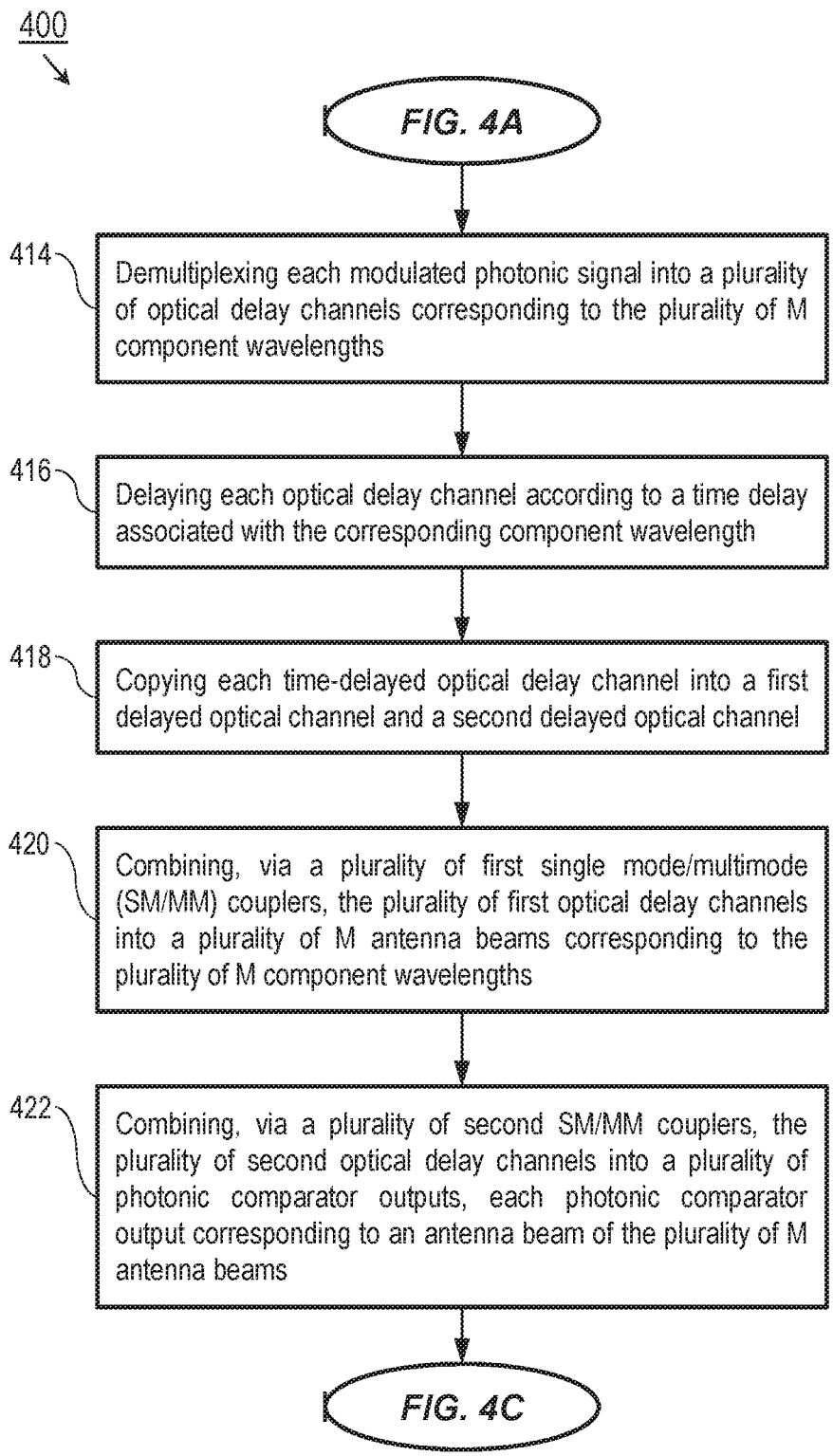

Referring to FIGS. 4A through 4C, the method 400 may be executed by embodiments of the photonic monopulse comparator 300 and may include the following steps.

At a step 402, a photonic signal source generates a set of M photonic inputs, each photonic input corresponding to a distinct component wavelength.

At a step 404, the set of M wavelength-selective photonic inputs is multiplexed (e.g., combined) into a single combined photonic input by an arrayed waveguide grating (AWG) or similar multiplexer.

At a step 406, an optical splitter splits the combined photonic input into multiple equivalent photonic inputs. For example, a quadrant splitter may split the photonic input into four equivalent inputs, or one per quadrant. An elemental splitter may further split the quadrant-specific input into N equivalent photonic inputs, or one per array element (e.g., of an N-element array).

At a step 408, a bank of optical attenuators may apodize each of the component wavelengths of each equivalent photonic input (e.g., after the photonic input is demultiplexed into its M component wavelengths and before the apodized component wavelengths are multiplexed back into a single apodized photonic input).

At a step 410, an antenna element (e.g., each of N array elements per quadrant) receives an inbound RF signal (e.g., at a particular angle of arrival). The inbound RF signal may be filtered, amplified, or otherwise processed.

At a step 412, each apodized photonic input is modulated according to the received RF signal by a Mach-Zehnder modulator (MZM) or similar dual-output electro-optical modulator, generating positive-polarity and negative-polarity modulated photonic signals having a relative RF phase of 180 degrees.

Referring in particular to FIG. 4B, at a step 414, the positive-polarity and negative-polarity modulated photonic signals are each demultiplexed into a set of M optical delay channels, each delay channel corresponding to a component wavelength.

At a step 416, each optical delay channel is delayed according to a time delay corresponding to the component wavelength.

At a step 418, each optical delay channel is copied into at least a first, or original, optical delay channel and a second, or copied, optical delay channel.

At a step 420, single mode/multimode (SM/MM) couplers combine the time-delayed optical delay channels to generate M optical antenna beams, each beam (as well as the set of time-delayed optical delay channels received by each coupler) corresponding to a component wavelength and its RF beam.

At a step 422, additional SM/MM couplers combine the copied time-delay optical delay channels to generate photonic comparator outputs corresponding to the antenna beams. For example, an elevational difference, sum, and azimuthal difference may be generated simultaneously with the optical antenna beam.

Referring to FIG. 4C, at a step 424, a set of photodiodes generates wavelength-selective RF beam signals based on optical antenna beams (i.e., photonic signals) received from the SM/MM couplers At a step 426, an additional set of photodiodes generates RF output signals based on the photonic comparator outputs received from the SM/MM couplers, creating the RF comparator output signals simultaneously with the RF beam signals.

In some embodiments, the method 400 includes an additional step 428. At the step 428, digital signal processors digitize the RF signals and determine angle of arrival information (e.g., elevational angle, azimuthal angle) based on the RF beam signals and comparator outputs received from the photodiodes.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A multi-beam photonic monopulse comparator, comprising:
   a plurality of photonic input sources corresponding to a plurality of wavelengths, each photonic input source configured to generate a photonic input associated with a component wavelength of the plurality of wavelengths;
   a first multiplexer (mux) optically coupled to the plurality of photonic input sources and configured to combine the plurality of photonic inputs into a combined photonic input;
   at least one first optical splitter optically coupled to the first mux and configured to split the combined photonic input into a plurality of combined photonic inputs;
   a plurality of array elements optically coupled to the at least one first optical splitter, each array element comprising:
      a first demultiplexer (demux) configured to separate each combined photonic input into a plurality of elemental channels, each elemental channel corresponding to a component wavelength of the plurality of wavelengths;
      an array of attenuators optically coupled to the first demux and configured to apodize the corresponding plurality of elemental channels;
      a second multiplexer (mux) optically coupled to the array of attenuators, the second mux configured to combine the apodized plurality of elemental channels into an apodized photonic input;
      at least one antenna element configured to receive an inbound radio frequency (RF) signal;
      an electro-optical modulator (EOM) in communication with the antenna element and optically coupled to the second mux, the EOM configured to generate a pair of modulated photonic signals by modulating the apodized photonic input based on the inbound RF signal;
      a pair of second demuxes optically coupled to the EOM, each second demux configured to separate the associated modulated photonic signal into an array of optical delay channels corresponding to the plurality of wavelengths;
      an array of optical time delay units (TDU) optically coupled to each second demux, each optical TDU corresponding to an optical delay channel and configured to delay the optical delay channel by a time delay corresponding to a component wavelength of the plurality of wavelengths;
      and
      a plurality of second optical splitters optically coupled to the array of optical TDUs and configured to receive the plurality of time-delayed optical delay channels therefrom, each second optical splitter configured to split the corresponding time-delayed optical delay channel into an original delayed photonic channel and a duplicate delayed photonic channel;
   a plurality of single mode/multimode (SM/MM) couplers corresponding to the plurality of wavelengths and optically coupled to the plurality of array elements, and comprising:
      a first plurality of SM/MM couplers configured to:
         1) receive the plurality of original delayed photonic channels from the plurality of second optical splitters;
         and
         2) generate at least one antenna beam corresponding to a component wavelength of the plurality of wavelengths by combining two or more of the original delayed photonic channels;
      and
      at least one second plurality of SM/MM couplers configured to:
         1) receive the plurality of duplicate delayed photonic channels from the plurality of second optical splitters;
         and
         2) generate at least one photonic comparator output by combining two or more of the duplicate delayed photonic channels;
   and
   a plurality of photodetectors optically coupled to the plurality of SM/MM couplers and comprising:
      a first plurality of photodetectors configured to convert the at least one antenna beam to an RF beam signal;
      and
      at least one second plurality of photodetectors configured to convert the at least one photonic comparator output to an RF output signal.

2. The multi-beam photonic monopulse comparator of claim 1, wherein:
   the plurality of photonic input sources includes M photonic input sources where M is an integer, the M photonic input sources associated with M component wavelengths;
   the plurality of elemental channels is a plurality of M elemental channels corresponding to the M component wavelengths;
   the array of attenuators is a plurality of M attenuators corresponding to the M component wavelengths;
   the array of optical delay channels is an array of M optical delay channels corresponding to the M component wavelengths;
   the first plurality of SM/MM couplers is a plurality of M SM/MM couplers;
   and
   the first plurality of photodetectors is a plurality of M photodetectors corresponding to the M component wavelengths.

3. The multi-beam photonic monopulse comparator of claim 2, wherein the at least one photonic comparator output includes at least one of:
   1) a first photonic comparator output corresponding to an elevational difference;
   2) a second photonic comparator output corresponding to a sum;
   and
   3) a third photonic comparator output corresponding to an azimuthal difference.

4. The multi-beam photonic monopulse comparator of claim 2, wherein:
   the plurality of EOM includes at least one Mach-Zehnder modulator (MZM) configured to generate at least a positive-polarity modulated photonic signal and a negative-polarity modulated photonic signal having a mutually relative RF phase difference of 180 degrees;

each pair of second demuxes includes:

a positive demux configured to separate the positive-polarity modulated photonic signal into an array of M positive-polarity optical delay channels corresponding to the M component wavelengths;
and
a negative demux configured to separate the negative-polarity modulated photonic signal into an array of M negative-polarity optical delay channels corresponding to the M component wavelengths;
and each array of optical TDUs includes:

an array of M positive TDUs optically coupled to the positive demux, each positive TDU configured to delay the corresponding positive-polarity optical delay channel;
and
an array of M negative TDUs optically coupled to the negative demux, each negative-polarity TDU configured to delay the corresponding negative-polarity optical delay channel.

5. The multi-beam photonic monopulse comparator of claim 1, wherein:

each first optical splitter includes a quadrant splitter:
and
the plurality of combined photonic inputs includes four quadrant photonic inputs output by the quadrant splitter, each quadrant photonic input corresponding to a quadrant subarray of four quadrant subarrays.

6. The multi-beam photonic monopulse comparator of claim 5, wherein each first optical splitter includes an elemental splitter coupled to each quadrant splitter, each elemental splitter configured to split the associated quadrant photonic input into a plurality of N elemental inputs corresponding to a plurality of N array elements associated with the quadrant subarray, where N is an integer, and wherein the first demux of each array element is configured to separate the corresponding elemental input into the plurality of elemental channels.

7. The multi-beam photonic monopulse comparator of claim 6, wherein:

the plurality of original delayed photonic channels is a plurality of 4N original delayed photonic channels corresponding to each array element of each quadrant subarray;
the at least one plurality of duplicate delayed photonic channels is at least one plurality of 4N second delayed photonic channels corresponding to each array element of each quadrant subarray;
and
the first plurality of SM/MM couplers and the at least one second plurality of SM/MM couplers are configured for simultaneous operation.

8. The multi-beam photonic monopulse comparator of claim 7, wherein each original delayed optical channel and each duplicate delayed optical channel incorporates a positive-polarity photonic channel or a negative-polarity photonic channel having an RF phase difference of 180 degrees relative to the positive-polarity photonic channel.

9. The multi-beam photonic monopulse comparator of claim 1, further comprising:

at least one digital signal processor (DSP) coupled to the plurality of second photodetectors, the DSP configured for at least one of digitizing and calculating angle of arrival information corresponding to the at least one inbound RF signal based on the at least one corresponding RF output signal.

10. A method for multi-beam photonic monopulse comparator operations, comprising:

generating a plurality of M photonic inputs corresponding to M component wavelengths via at least one photonic input source;
multiplexing the plurality of M photonic inputs into a combined photonic input;
splitting the combined photonic input into a plurality of equivalent combined photonic inputs;
apodizing each of the plurality of equivalent combined photonic inputs via a plurality of attenuators;
receiving at least one inbound RF signal via an antenna element;
generating two or more modulated photonic signals by modulating, via at least one electro-optical modulator (EOM), each of the apodized combined photonic inputs according to the received inbound RF signal;
demultiplexing each modulated photonic signal into a plurality of optical delay channels corresponding to the M component wavelengths;
delaying each optical delay channel according to a time delay associated with a component wavelength of the M component wavelengths;
generating at least one plurality of duplicate delayed optical channels by copying each time-delayed optical delay channel;
combining, via a first plurality of single mode/multimode (SM/MM) couplers, the plurality of time-delayed optical delay channels into a plurality of M antenna beams corresponding to the M component wavelengths;
combining, via at least one second plurality of SM/MM couplers, the at least one plurality of duplicate optical delay channels into a plurality of photonic comparator outputs corresponding to the plurality of M antenna beams;
generating, via a first plurality of photodiodes, a plurality of M RF beam signals based on the plurality of M antenna beams; and
generating, via at least one plurality of second photodiodes, at least one plurality of RF output signals based on the at least one plurality of photonic comparator outputs.

11. The method of claim 10, wherein splitting the combined photonic input into a plurality of equivalent combined photonic inputs includes:

splitting the combined photonic input into a plurality of four quadrant photonic inputs, each quadrant photonic input corresponding to a quadrant subarray;
and
splitting each quadrant photonic input into a plurality of N elemental inputs corresponding to a plurality of N array elements associated with the quadrant subarray.

12. The method of claim 10, wherein generating two or more modulated photonic signals by modulating, via an electro-optical modulator (EOM), each of the apodized combined photonic inputs according to the received inbound RF signal includes:

generating at least a positive modulated photonic signal and a negative modulated photonic signal having a mutually relative phase difference of 180 degrees by modulating, via at least one Mach-Zehnder modulator (MZM), each apodized combined photonic input according to the received inbound RF signal.

13. The method of claim 10, wherein combining, via at least one second plurality of SM/MM couplers, the at least one plurality of duplicate optical delay channels into a plurality of photonic comparator outputs corresponding to the plurality of M antenna beams includes:

combining, via at least one second plurality of SM/MM couplers, the at least one plurality of second optical delay channels into at least one of 1) a first photonic comparator output corresponding to an elevational difference of the antenna beam, 2) a second photonic comparator output corresponding to a sum of the antenna beam, and 3) a third photonic comparator output corresponding to an azimuthal difference of the antenna beam.

14. The method of claim 10, wherein combining, via at least one second plurality of SM/MM couplers, the at least one plurality of duplicate optical delay channels into a plurality of photonic comparator outputs corresponding to the plurality of M antenna beams includes: combining the at least one plurality of duplicate optical delay channels into a plurality of photonic comparator outputs simultaneously with the combining, via a first plurality of time-delayed single mode/multimode (SM/MM) couplers, of the plurality of first optical delay channels into a plurality of M antenna beams;

and wherein generating, via at least one plurality of second photodiodes, at least one plurality of RF output signals based on the at least one plurality of photonic comparator outputs includes: generating the at least one plurality of RF output signals simultaneously with the generating, via a first plurality of photodiodes, the plurality of M RF beam signals.

15. The method of claim 10, further comprising:

determining, via at least one digital signal processor, angle of arrival information corresponding to the at least one inbound RF signal based on the at least one plurality of RF output signals.

* * * * *